United States Patent [19]
Räsänen

[11] Patent Number: 5,805,301
[45] Date of Patent: Sep. 8, 1998

[54] FACSIMILE TRANSMISSION IN A MOBILE COMMUNICATION SYSTEM

[75] Inventor: Juha Räsänen, Espoo, Finland

[73] Assignee: Nokia Telecommunications Oy, Espoo, Finland

[21] Appl. No.: 732,467

[22] PCT Filed: Mar. 6, 1996

[86] PCT No.: PCT/FI96/00136

§ 371 Date: Nov. 5, 1996

§ 102(e) Date: Nov. 5, 1996

[87] PCT Pub. No.: WO96/27975

PCT Pub. Date: Sep. 12, 1996

[30] Foreign Application Priority Data

Mar. 6, 1995 [FI] Finland ..................................... 951020

[51] Int. Cl.$^6$ .................................................. H04N 1/333
[52] U.S. Cl. .................... 358/425; 358/435; 370/536; 455/450; 455/509
[58] Field of Search ..................... 358/409, 412, 358/425, 435; 370/465, 468, 536; 455/426, 450, 455, 509, 517; H04N 1/333

[56] References Cited

U.S. PATENT DOCUMENTS

| | | | |
|---|---|---|---|
| 4,805,167 | 2/1989 | Leslie et al. | 370/84 |
| 5,050,004 | 9/1991 | Morton, Jr. | 358/405 |
| 5,278,827 | 1/1994 | Pound | 370/84 |
| 5,335,225 | 8/1994 | Brax | 370/84 |
| 5,583,851 | 12/1996 | Kato et al. | 370/468 |

FOREIGN PATENT DOCUMENTS

| | | | |
|---|---|---|---|
| 334 669 | 9/1989 | European Pat. Off. | |
| 4-196967 | 7/1992 | Japan | H04N 1/32 |
| 9-172427 | 6/1997 | Japan | H04J 4/00 |
| 94/05114 | of 0000 | WIPO | |
| 95/15644 | 6/1995 | WIPO | |
| WO 95/31878 | 11/1995 | WIPO | H04Q 7/22 |
| WO 96/18248 | 6/1996 | WIPO | H04B 7/26 |

OTHER PUBLICATIONS

CCITT Blue Book: V 110, "Data Communication over the Telephone Network", Sep. 1992.

CCITT Blue Book: V 24, "Data Communication over the Telephone Network", Mar. 1993.

Patent Abstract of Japan, vol. 16, No. 530, E–1287,Shigeru Mikami, 16 Jul. 1992.

*Primary Examiner*—Kim Yen Vu
*Assistant Examiner*—Kimberly A. Williams
*Attorney, Agent, or Firm*—IP Group of Pillsbury Madison & Sutro LLP

[57] ABSTRACT

A digital mobile communication system comprises a mobile station(MS) with a facsimile adapter(2), a first telefax terminal(1) connected to the adapter, a mobile network(BSS, MSC), an interworking unit(32) with a second facsimile adapter(33). A high-speed transparent rate-adapted facsimile connection is set up between the telefax terminals. The number of parallel traffic channels(ch0–chn) allocated to the high-speed data connection is such that the maximum data rate of the data connection is higher than the allowed maximum 10 data rate of the telefax terminals(1,10). The telefax terminals may negotiate the facsimile data rate. The second facsimile adapter(33) monitors the negotiation and selects, on the basis of the negotiated facsimile data rate, the most effective channel coding available for the data connection.

7 Claims, 2 Drawing Sheets

FACSIMILE TRANSMISSION IN A MOBILE COMMUNICATION SYSTEM

This application is the national phase of international application PCT/FI96/00136, filed Mar. 6, 1996 which designated the U.S.

FIELD OF THE INVENTION

The invention relates to facsimile transmission in mobile communication systems.

BACKGROUND OF THE INVENTION

ITU-T Recommendation T.30 defines procedures for document facsimile transmission in the public switched telephone network. The facsimile terminals according to this recommendation are called Group 3 Facsimile terminals. A characteristic of the Group 3 facsimile terminals is that they are able to negotiate, in the beginning of a call, the facsimile data rate that is most suitable for the connection quality. The facsimile data rate can be renegotiated during the call if the connection quality changes. The data rates generally used for the Facsimile Group 3 are presently 2.4, 4.8, 7.2, 9.6, 12.0 and 14.4 Kbps. The new Facsimile Group 3 data rates that will be supported by data modems in the near future include 16.6, 19.2, 21.6, 24.0, 26.4 Kbps, etc. in steps of 2.4 Kbps up to 38.4 Kbps, or higher.

The present telefax terminals have been designed for fixed telephone networks and they employ a modem interface and a two-wire connection (modem connection) via a telephone network. Thus all signalling between telefax terminals has taken place over a modem connection. It has not been necessary for the telephone network to monitor for example the facsimile data rate negotiated by the telefax terminals or to respond to the data rate by modifying the characteristics of the modem connection.

In a digital cellular radio network, the telefax terminal is located at a mobile station, whereupon the facsimile connection must be established through a radio link between the mobile station and the fixed radio network. For example in the Recommendation 03.45, version 4.4.0, of the Pan-European mobile system GSM (Global System for Mobile Communications), the technical implementation of the service supporting the terminal equipments of Facsimile Group 3 is determined by using transparent telecommunication services of the GSM system. One full-rate GSM traffic channel can support the facsimile data rates of 2.4, 4.8, 7.2 and 9.6 Kbps. The equipment configuration according to the recommendation is illustrated in FIG. 1. A telefax terminal 1 is connected with a normal two-wire modem connection to a facsimile adapter 2 which adapts the signals of the modem connection to a rate-adapted V.110 data connection. The V.110 connection is established via a radio interface between a mobile station MS 3 and a base station system BSS 6 to a mobile services switching centre MSC and further to an interworking function (IWF) 8 located at the MSC. The interworking function 8 contains another facsimile adapter 8A which adapts the aforementioned data link to a conventional two-wire modem connection which is established for example via the public telephone network (PSTN) 9 to another telefax terminal 10. As an alternative to the configuration of FIG. 1, the telefax terminal 1 and the facsimile adapter 2 may be integrated into a GSM telefax terminal which provides an analog output. From the point of view of the mobile station MS, the GSM telefax terminal is as the facsimile adapter 2.

The idea of the GSM Recommendation 03.45 is to allow the T.30 protocol to pass transparently, whenever possible, through the adapters 2 and 8 at the ends of the GSM data link. The T.30 protocol is only manipulated when it is necessary to avoid problems resulting from the differences between the PSTN and GSM systems. For example in a GSM facsimile call, the user data rate which is determined by the GSM network during the call set-up (on the basis of information received from the mobile station or from the subscriber data) is the allowed maximum data rate during the call. However, the telefax terminals may negotiate the actual facsimile data rate during the call according to the ITU-T Recommendation T.30. This actual data rate may vary between 2.4 Kbps and the allowed maximum data rate. The facsimile adapter 8A of the network termination monitors the negotiation, and if the data rate agreed on is too high, the facsimile adapter 8A intervenes in the negotiation. However, the telefax terminals typically begin negotiating for a lower data rate when the connection quality is too low. In such a case, the facsimile adapter 8A monitors the negotiation and adapts the GSM traffic channel to the negotiated facsimile rate with a Channel Mode Modify procedure (CMM). Decreasing the data rate also results in better and more effective channel coding. The GSM system utilizes convolutional coding the efficiency of which can be indicated with a convolutional code ratio X/Y which means that in the channel coding X data bits are represented by Y code bits. In a full-rate GSM traffic channel, the convolutional code ratios of ½, ⅓ and ⅙ are valid at the user data rates of 9.6 Kbps, 4.8 Kbps and 2.4 Kbps, respectively.

The GSM system cannot presently support the facsimile services higher than 9.6 Kbps, however.

An arrangement by means of which higher facsimile data rates (12 Kbps, 14.4 Kbps, etc.) can also be supported is disclosed in a co-pending patent application of the Applicant, WO95/31878 (unpublished on the filing date of the present application). In this arrangement, two or more parallel traffic channels (subchannels) are allocated for one high-speed data connection over the radio path. The high-rate data signal is divided in the transmitter into these parallel subchannels for the transmission over the radio path, to be restored in the receiver. This approach enables the supply of data transmission services wherein the transmission rate is as high as eight-fold compared to the conventional transmission rate, depending on the number of the traffic channels allocated. For example in the GSM system, the total user data rate of 19.2 Kbps is obtained by two parallel 9.6 Kbps subchannels, each channel being rate-adapted in the same manner as in the existing transparent 9.6 Kbps bearer services of the GSM system. Correspondingly, the user rate of 24 Kbps can be transmitted on three parallel traffic channels.

When the Facsimile Group 3 service is applied to such high-speed data transmission service, the problem is how to utilize the ability of the Group 3 facsimile terminals to renegotiate the facsimile data rate to correspond to the quality of the traffic channel and to simultaneously provide the user with the highest possible facsimile data rate.

DISCLOSURE OF THE INVENTION

An object of the present invention is to eliminate this problem.

A first aspect of the invention is a method for facsimile transmission in a digital mobile communication network, the method comprising steps of initiating facsimile call set-up, establishing a transparent rate-adapted data connection between a facsimile adapter of a mobile station, connected to the first telefax terminal, and a facsimile adapter in an interworking unit, selecting preliminary data rate and channel coding for the data connection, establishing an end-to-end facsimile connection between the first and the second telefax terminal transparently through the facsimile adapters and the data connection, negotiating the facsimile data rate for the facsimile connection by signalling between the telefax terminals, changing the data rate and the channel coding of the data connection depending on the negotiated facsimile data rate. The method is characterized by further steps of

- allocating parallel traffic channels for said data connection, when the maximum data rate allowed for the telefax terminals on said data connection is higher than the maximum data rate of an individual traffic channel,
- selecting the number of said allocated traffic channels so that the maximum data rate of the data connection is higher than the maximum data rate allowed for the telefax terminals,
- selecting the most effective channel coding available, enabled by the extra transmission capacity of the data connection, for each facsimile data rate negotiated by the telefax terminals.

A second aspect of the invention is a mobile system comprising a mobile station, a facsimile adapter in the mobile station, a first telefax terminal connected to the adapter, a mobile network, an interworking unit in the mobile network, a facsimile adapter in the interworking unit, the mobile network being able to set up a facsimile connection between the first telefax terminal and the second telefax terminal via the facsimile adapter of the mobile station and the facsimile adapter of the network termination in such a way that between the facsimile adapters there is a transparent rate-adapted data connection and the mobile network is able to change the channel coding in said data connection according to the facsimile data rate negotiated by the telefax terminals. The system is characterized in that

- the mobile network is arranged to allocate for said data link a number of parallel traffic channels (ch0–chn) when the maximum data rate allowed for the telefax terminals on said data connection is higher than the data rate of an individual traffic channel, said number of the traffic channels being such that the maximum data rate of the data connection is higher than said maximum data rate allowed for the telefax terminals,
- the mobile network is arranged to select the most effective channel coding available, enabled by the extra transmission capacity of the data connection, for each facsimile data rate negotiated by the telefax terminals.

In the invention, the number of parallel traffic channels allocated to a high-speed facsimile call requiring multichannel data connection is higher than the number of traffic channels necessary according to the maximum data rate of the call. In other words, the maximum number of the traffic channels may be higher than what is necessary in ideal conditions, and the maximum data rate of the traffic channel capacity available to the facsimile call may therefore be higher than the highest facsimile data rate supported by the telefax terminals. The extra traffic channel capacity enables changing the channel coding on a multichannel data connection to more effective one with a smaller decrease in the facsimile data rate in comparison to a case in which only the required minimum number of traffic channels is allocated to the facsimile call.

BRIEF DESCRIPTION OF THE DRAWINGS

In the following, the invention will be described by means of preferred embodiments with reference to the accompanying drawings, in which.

PREFERRED EMBODIMENTS OF THE INVENTION

Figure 1:
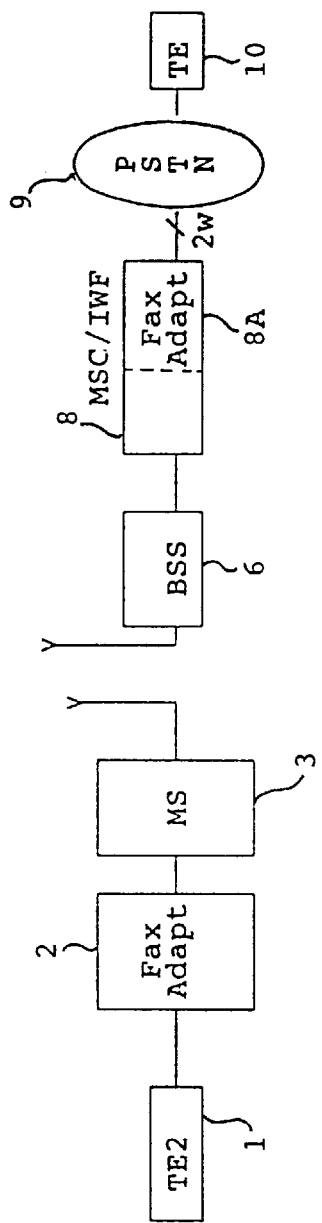
FIG. 1 illustrates the equipment configuration according to the GSM recommendations for facsimile transmission.

The present invention may be applied to high-speed data transmission in digital TDMA-type mobile communication systems, such as the Pan-European digital mobile communication system GSM, DCS1800 (Digital Communication System), the mobile communication system according to the EIA/TIA Interim Standard IS/41.3, etc. The invention will be illustrated below by using as an example a GSM-type mobile system, without being restricted thereto, however. The basic structural components of the GSM system will be introduced very briefly below with reference to FIG. 1, without describing their characteristics or the other elements of the system. For a more detailed description of the GSM system, reference is made to the GSM recommendations and to "The GSM System for Mobile Communications" by M. Mouly and M. Pautet (Palaiseau, France, 1992, ISBN:2-9507190-07-7).

A mobile services switching centre MSC controls the switching of incoming and outgoing calls. It performs similar functions as the exchange of the PSTN. Further, it also performs, together with the network subscriber registers, functions, such as location management, that are only characteristic of mobile telephone traffic. Mobile stations MS are connected to the MSC via base station systems BSS. A base station system BSS consists of a base station controller BSC and base stations BTS, which are not shown in FIG. 1.

The GSM system is a time division multiple access (TDMA) type system wherein the communication on the radio path is time divisional and occurs in successive TDMA frames each of which consists of several time slots. A short information packet is transmitted in each time slot in the form of a radio-frequency burst that has a limited duration and that consists of a number of modulated bits. The time slots are primarily used for conveying control and traffic channels. The traffic channels are used for transferring speech or data. The control channels are for signalling between a base station and mobile stations.

A data link formed by one traffic channel is a V.110 rate-adapted, UDI-coded digital 9.6/4.8/2.4 Kbps full-duplex connection that is adapted to V.24 interfaces. The V.110 connection is a digital transmission channel that was originally developed for ISDN (Integrated Services Data Network) technology, that is adapted to the V.24 interface, and that also provides the possibility of transmitting V.24 statuses (control signals). The CCITT recommendation for a V.110 rate-adapted connection is disclosed in the CCITT Blue Book: V.110. The CCITT recommendation for a V.24 interface is disclosed in the CCITT Blue Book: V.24.

Furthermore, the traffic channel uses channel coding which aims at decreasing the effect of transmission errors. The GSM system utilizes convolutional coding the efficiency of which can be detected with a convolutional code ratio X/Y, which means that in the channel coding X data bits are represented by Y code bits. On the full-rate GSM traffic channel, the convolutional code ratios of ½, ⅓ and ⅙ are valid at the user data rates of 9.6 Kbps, 4.8 Kbps and 2.4 Kbps, respectively.

The GSM Recommendation 03.45, version 4.4.0 determines the technical implementation of the service supporting the terminal equipments of Facsimile Group 3 by utilizing the transparent telecommunication services of the GSM system. The equipment configuration and the operation according to the invention were described above in connection with FIG. 1. However, this recommendation relates to Group 3 facsimile service occurring only on one traffic channel, wherefore the highest possible facsimile data rate is 9.6 Kbps.

The Applicant's co-pending patent applications WO95/31878 and PCT/FI95/00673 disclose a method wherein two or more time slots are allocated from a TDMA frame to a mobile station MS which requires data transmission with a higher rate than that supported by one traffic channel. The maximum user data rate of a multichannel data connection is the number of the parallel traffic channels multiplied by the user data rate 9.6 Kbps of one traffic channel. For example the user rate of 19.2 Kbps can therefore be provided with a minimum of two 9.6 Kbps traffic channels. This procedure is set forth in the present application as an exemplary manner of carrying out high-speed data transmission, based on several parallel traffic channels, in a radio system. As regards the details of this procedure, reference is made to the aforementioned patent applications. It should be noted, however, that the only matter essential for the invention is that a multichannel connection can be established, and the present invention relates only to optimizing the channel coding and the data rate when such a multichannel connection is used for facsimile transmission.

Figure 2:
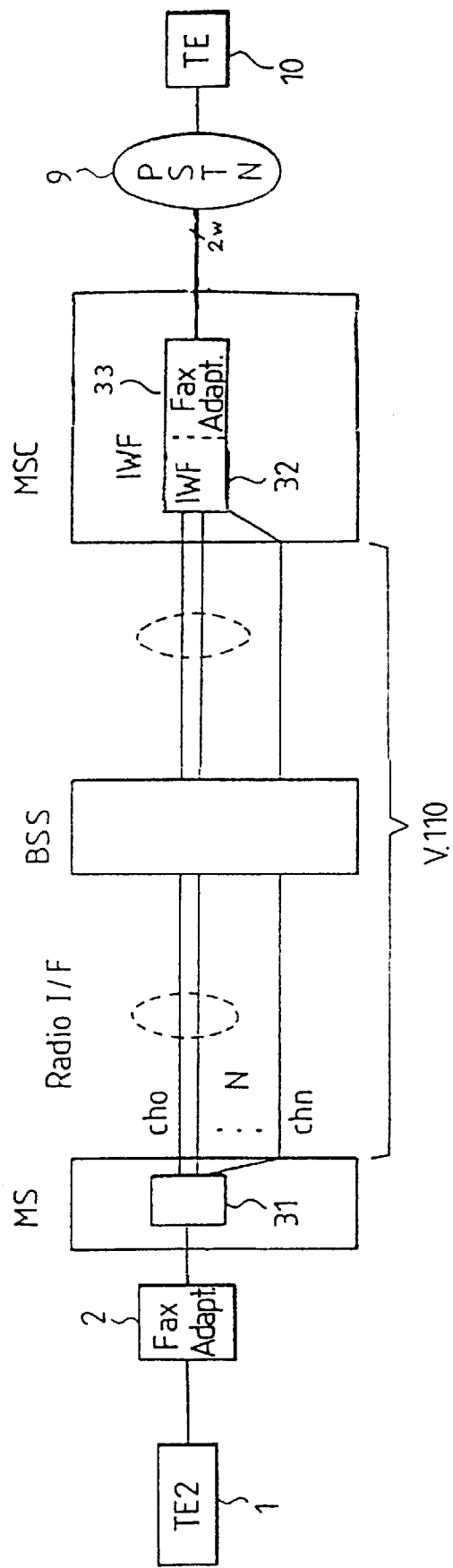
FIG. 2 illustrates the network architecture according to the invention, supporting multichannel facsimile transmission in the GSM system.

FIG. 2 illustrates the GSM network architecture which implements a Group 3 facsimile service utilizing several parallel traffic channels. A telefax terminal 1 is connected with a normal two-wire modem connection to a facsimile adapter 2 by means of which the signals of the modem connection are adapted to a rate-adapted data connection. A V.110 connection is formed via a radio interface between a mobile station MS and a base station system BSS to the mobile services switching centre MSC and further to an interworking function 32 (IWF) situated in the MSC. The interworking function 32 contains a second facsimile adapter 33 which adapts the aforementioned data connection to a conventional two-wire modem connection which is established, for example, via the PSTN to another telefax terminal 10. In the preferred embodiment of the invention, the facsimile adapters are adapters according to the GSM Recommendation 03.45 comprising a modem unit which provides a standard modem connection towards the telefax terminal 1 and correspondingly towards the PSTN or the ISDN (3.1 kHz audio) or to another or the same GSM network.

In the preferred embodiment of the invention, a rate-adapted data connection is set up between a terminal adapter 31 in the mobile station and an interworking function IWF 32 in the fixed network by utilizing two or more parallel GSM traffic channels ch0 to chn. In the mobile station, the terminal adapter 31 operates as a divider dividing a high-speed facsimile signal from the facsimile adapter 2 to parallel traffic channels ch0 to chn, and as a combiner combining the low-speed signal fragments received from the parallel traffic channels ch0 to chn into a high-speed facsimile signal which is supplied to the facsimile adapter 2. Correspondingly, at the opposite end of the multichannel data connection the interworking function 32 operates as a divider dividing a high-speed facsimile signal from the modem unit of the facsimile adapter 33 to the parallel traffic channels ch0 to chn, and as a combiner combining the low-speed signal fragments received from the parallel traffic channels ch0 to chn into a high-speed facsimile signal which is supplied to the modem unit of the facsimile adapter 33.

When the Group 3 facsimile service is applied to the multichannel high-speed data link of FIG. 2, the problem is how to fully utilize the ability of Group 3 facsimile terminals to renegotiate the facsimile data rate to correspond to the quality of the traffic channel and to simultaneously provide the user with the highest possible facsimile data rate.

The invention allows the mobile network to allocate, during call set-up, more parallel traffic channels than what would be necessary on the basis of the maximum data rate of the facsimile call to a facsimile call requiring a multichannel high-speed data link. In other words, the maximum number of the traffic channels may be higher than what is necessary in ideal conditions, and the maximum data rate of the traffic channel capacity available to the facsimile call may therefore be higher than the highest facsimile data rate supported by the telefax terminals. The extra traffic channel capacity enables changing the channel coding on a multichannel data connection to more effective one with a smaller decrease in the facsimile data rate than when the required minimum number of traffic channels are used.

In the following, a facsimile call according to the invention will be described in the system of FIG. 2.

The mobile services switching centre MSC receives a facsimile call from a telefax terminal 10 from the public telephone network PSTN. The MSC performs a subscriber data inquiry into the Visitor Location Register VLR (not shown) and initiates the call set-up to the mobile station MS according to the GSM Specifications. The MSC obtains, from the subscriber data or from the mobile station MS, information of the maximum data rate allowed for the telefax terminal 1 in a GSM facsimile call. The MSC detects that this allowed maximum data rate exceeds the maximum data rate of an individual GSM traffic channel, wherefore a multichannel data connection is required. The MSC determines the minimum number of parallel traffic channels that is needed on the data connection to support the aforementioned maximum data rate, but if required, it allocates one or several additional traffic channels for the data connection in such a way that the maximum data rate of the data link is significantly higher than the allowed maximum data rate of the telefax terminal 1. The magnitude of the additional traffic channel capacity is selected in such a way that effective channel coding can be changed to the data connection with as small a decrease as possible in the total data rate of the data link. In principle, this would be best obtained by immediately utilizing a large number of traffic channels each of which would have a low data rate and an effective channel coding, e.g. 4.8 Kbps and the convolutional code ratio of ½. However, this approach would take up too many traffic channels, and therefore the amount of the additional traffic channel capacity is a compromise between these two criteria. The traffic load of the communication system may also restrict the amount of the additional traffic channel capacity available or prevent the allocation of extra traffic channels altogether.

When a multichannel GSM data connection has been established and the facsimile adapters 2 and 32, 33 have been connected to the data connection, the MSC sets up an end-to-end connection between the telefax terminals 1 and 10. According to the principles of the GSM Recommendation 03.45, the T.30 protocol signalling is transmitted transparently, whenever possible, through the adapters 2 and 33 at the ends of the GSM data connection. The T.30 protocol is only manipulated when it is necessary to avoid problems resulting from the differences between the PSTN and GSM systems. Therefore, the facsimile adapter 33 monitors the signalling between the telefax terminals 1 and 10.

After call set-up, the telefax terminals negotiate the actual facsimile data rate according to the ITU-T Recommendation T.30. A similar negotiation can be repeated, if necessary, later during the call. This actual data rate may vary between 2.4 Kbps and the allowed maximum data rate. The facsimile adapter 33 of the network termination monitors the negotiation and if a facsimile data rate exceeding the allowed maximum data rate is agreed on, the facsimile adapter 33 intervenes in the negotiation. If the negotiated facsimile data rate is acceptable, the facsimile adapter initiates a Channel Mode Modify (CMM) procedure for adapting channel coding to the actual facsimile data rate, if necessary. The telefax terminals typically begin negotiating for a rate decrease when the quality of the transmission is too low. Correspondingly, the aim of the negotiation can also be a facsimile rate higher than the present one.

The facsimile adapter 33 calculates the optimum conditions, i.e. decision values, for changing the channel coding on traffic channels of a multichannel data link. The calculation is based on the actual number of available traffic channels and the maximum data rates of traffic channels with different channel codings.

For this calculation, the facsimile adapter 33 has information of the allowed maximum data rate of the facsimile call and the number of the parallel full-rate traffic channels allocated to the call. The adapter 33 calculates a theoretical maximum data rate for each available channel coding with the aforementioned number of the allocated parallel traffic channels. In order to determine the optimum conditions for changing channel coding when the telefax terminals 1 and 10 negotiate a lower facsimile data rate, the adapter 33 compares the facsimile data rate negotiated by the telefax terminals with the maximum data rates of different channel codings.

If the negotiated facsimile data rate is lower than the present data rate and equal to or lower than the maximum data rate of the channel coding that is more effective than the present one, the adapter 33 starts the CMM procedure in order to change the channel coding to more effective one.

If the negotiated facsimile data rate is higher than the present data rate and higher than the maximum data rate of the present channel coding, the adapter starts the CMM procedure in order to change the channel coding to less effective one.

If the negotiated facsimile data rate is lower than the maximum data rate of the present channel coding but higher than the maximum data rate of the next more effective channel coding, the adapter 33 retains the present channel coding.

If the negotiated facsimile data rate is higher than the maximum data rate of the next more efficient channel coding but lower than or equal to the maximum data rate of the present channel coding, the adapter 33 retains the present channel coding.

Two examples will be described below.

EXAMPLE 1.

Assume that the allowed maximum data rate is 14.4 Kbps. A minimum number of traffic channels, i.e. two parallel 9.6 Kbps traffic channels, are allocated to the call. The facsimile adapter 33 determines the following maximum data rates and convolutional code ratios FEC to the different channel codings:

$2*9.6=19.2$ Kbps, FEC=$\frac{1}{2}$ $2*4.8=9.6$ Kbps, FEC=$\frac{1}{3}$ $2*2.4=4.8$ Kbps, FEC=$\frac{1}{6}$.

Therefore channel coding FEC=$\frac{1}{2}$ is used in the beginning of the call. If the quality of the traffic channels proves to be too low for facsimile transmission, the telefax terminals 1 and 10 begin negotiating for a lower facsimile data rate. The next highest rate is 12 Kbps which still requires the use of the channel coding FEC=$\frac{1}{2}$, wherefore the adapter 33 does not change the channel coding. The quality of the traffic channel is still poor, and the telefax terminals 1 and 10 start renegotiating for the next highest rate, which is 9.6 Kbps. At the rate of 9.6 Kbps, it is possible to use more effective channel coding FEC=$\frac{1}{3}$ with two traffic channels, wherefore the adapter 33 starts the CMM procedure for changing the channel coding FEC=$\frac{1}{3}$ to both of the parallel traffic channels.

EXAMPLE 2.

Assume that the allowed maximum data rate is 19.2 Kbps. The minimum requirement would then be two parallel traffic channels, but the MSC allocates three traffic channels, i.e. one extra traffic channel, according to the principles of the invention. The facsimile adapter 33 determines the following maximum data rates and convolutional code ratios FEC for the different channel codings:

$3*9.6=28.8$ Kbps, FEC=$\frac{1}{2}$ $3*4.8=14.4$ Kbps, FEC=$\frac{1}{3}$ $3*2.4=7.2$ Kbps, FEC=$\frac{1}{6}$.

Therefore, channel coding FEC=$\frac{1}{2}$ is used in the beginning of the call. If the quality of the traffic channel proves to be too poor for facsimile transmission, the telefax terminals 1 and 10 start negotiating for a lower facsimile data rate. The next highest rate is 16.8 Kbps which still uses the channel coding FEC=$\frac{1}{2}$, wherefore the adapter 33 does not change the channel coding. The quality of the traffic channel is still poor and the telefax terminals 1 and 10 start renegotiating for the next highest rate, which is 14.4 Kbps. At the rate of 14.4 Kbps, it is possible to use more efficient channel coding FEC=$\frac{1}{3}$ with three traffic channels, wherefore the adapter 33 starts the CMM procedure for changing the channel coding to all parallel traffic channels.

In both examples, the poor quality of the traffic channel may result in new rate negotiations and the use of the channel coding FEC=$\frac{1}{6}$. On the other hand, improvement in the quality of the traffic channel may lead to negotiations for increasing the rate. In such a case, the adapter 33 does not allow the facsimile data rate to be increased beyond the maximum data rate, i.e. 14.4 or 19.2 Kbps, determined during the call set-up, even though the traffic channel capacity were higher.

Even though the invention is described above with reference to certain embodiments, it should be understood that the description is intended to be only exemplary and it may be varied and modified without deviating from the spirit and scope of the invention defined in the appended claims.

I claim:

1. A method for facsimile transmission in a digital mobile communication network, the method comprising steps of
    initiating facsimile call set-up,
    establishing a transparent rate-adapted data connection between a facsimile adapter of a mobile station, connected to the first telefax terminal, and a facsimile adapter in an interworking unit,
    selecting preliminary data rate and channel coding for a data connection,
    establishing an end-to-end facsimile connection between the first and the second telefax terminal transparently through the facsimile adapters and the data connection, negotiating the facsimile data rate for a facsimile connection by signalling between the telefax terminals, changing a data rate and the channel coding of the data connection depending on the negotiated facsimile data rate, characterized by further steps of allocating parallel traffic channels for said data connection, when the maximum data rate allowed for the telefax terminals on said data connection is higher than the maximum data rate of an individual traffic channel, selecting the number of said allocated traffic channels so that a maximum data rate of the data connection is higher than the maximum data rate allowed for the telefax terminals, selecting the most effective channel coding available, enabled by the extra transmission capacity of the data connection, for each facsimile data rate negotiated by the telefax terminals.

2. A method according to claim 1, characterized by selecting channel coding for the negotiated facsimile data rate, based on said number of the available traffic channels and the maximum data rates of the traffic channels with different channel codings.

3. A method according to claim 1 or 2, characterized by calculating a maximum data rate for each available channel coding when said number of parallel traffic channels are used, comparing the facsimile data rate negotiated by the telefax terminals with the maximum data rates of said different channel codings, changing the channel coding to more effective one if the negotiated facsimile data rate is lower than the present data rate and equal to or lower than the maximum data rate of said more effective channel coding, changing the channel coding to less effective one if the negotiated facsimile data rate is higher than the present data rate and higher than the maximum data rate of the present channel coding, maintaining the present channel coding if the negotiated facsimile data rate is lower than the maximum data rate of the present channel coding but higher than the maximum data rate of the next more efficient channel coding, maintaining the present channel coding if the negotiated facsimile data rate is higher than the maximum data rate of the next more efficient channel coding but lower than or equal to the maximum data rate of the present channel coding.

4. A mobile system comprising a mobile station (MS), a facsimile adapter (2) in the mobile station, a first telefax terminal (1) connected to the adapter, a mobile network (BSS, MSC), an interworking unit (32) in the mobile network, a facsimile adapter (33) in the interworking unit, the mobile network being able to set up a facsimile connection between the first telefax terminal (1) and a second telefax terminal (10) via the facsimile adapter (2) of the mobile station and the facsimile adapter (33) of the inter working unit in such a way that between the facsimile adapters there is a transparent rate-adapted data connection (V.110nd the mobile network is able to change the channel coding used in said data connection according to a facsimile data rate negotiated by the telefax terminals, characterized in that the mobile network (MSC) is arranged to allocate for said data connection (V.110) a number of parallel traffic channels (ch0-chn) when the maximum data rate allowed for the telefax terminals on said data connection is higher than a data rate of an individual traffic channel, said number of the traffic channels being such that the maximum data rate of the data connection is higher than said maximum data rate allowed for the telefax terminals, the mobile network is arranged to select the most effective channel coding available, enabled by the extra transmission capacity of the data connection, for each facsimile data rate negotiated by the telefax terminals.

5. A system according to claim 4, characterized in that the mobile network is arranged to select the channel coding for the negotiated facsimile data rate on the basis of said number of traffic channels and the maximum data rates of the traffic channels with different channel codings.

6. A system according to claim 4 or 5, characterized in that the mobile network calculates a maximum data rate for each available channel coding when said number of parallel traffic channels are used, the mobile network compares the facsimile data rate negotiated by the telefax terminals with the maximum data rates of the different channel codings, the mobile network changes the channel coding to more effective one if the negotiated facsimile data rate is lower than the present data rate and equal to or lower than the maximum data rate of said more effective channel coding, the mobile network changes the channel coding to less effective one if the negotiated facsimile data rate is higher than the present data rate and higher than the maximum data rate of the present channel coding, the mobile network maintains the present channel coding if the negotiated facsimile data rate is lower than the maximum data rate of the present channel coding but higher than the maximum data rate of the next more effective channel coding, the mobile network maintains the present channel coding if the negotiated facsimile data rate is higher than the maximum data rate of the next more efficient channel coding but lower than or equal to the maximum data rate of the present channel coding.

7. A system according to claim 4, 5 characterized in that the unit of the mobile network monitoring the negotiation of the telefax terminals and changing the channel coding of the data link is the facsimile adapter (33) of the interworking unit.

\* \* \* \* \*